(12) United States Patent
Furman et al.

(10) Patent No.: US 8,311,488 B2
(45) Date of Patent: Nov. 13, 2012

(54) HIGH FREQUENCY AUTOMATIC LINK ESTABLISHMENT COMMUNICATION SYSTEM WITH WIDEBAND PROBE AND RELATED METHOD

(75) Inventors: William Nelson Furman, Fairport, NY (US); John W. Nieto, Rochester, NY (US); Eric N. Koski, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 141 days.

(21) Appl. No.: 12/855,043

(22) Filed: Aug. 12, 2010

(65) Prior Publication Data
US 2012/0040618 A1 Feb. 16, 2012

(51) Int. Cl.
*H04B 1/00* (2006.01)
(52) U.S. Cl. ............................................ 455/69; 455/68
(58) Field of Classification Search .................. 455/62, 455/67, 67.11, 67.13, 3.05, 563, 77, 466; 370/477, 521, 312; 709/203, 219
See application file for complete search history.

(56) References Cited

U.S. PATENT DOCUMENTS

| | | | | |
|---|---|---|---|---|
| 5,802,469 | A | 9/1998 | Nounin et al. | 455/422 |
| 5,930,685 | A * | 7/1999 | Straub | 455/72 |
| 6,615,267 | B1 * | 9/2003 | Whalen et al. | 709/229 |
| 7,366,232 | B2 | 4/2008 | Bruas | 375/222 |
| 2003/0224815 | A1 * | 12/2003 | Rodman et al. | 455/517 |
| 2005/0053378 | A1 * | 3/2005 | Stanchfield et al. | 398/115 |
| 2005/0273330 | A1 * | 12/2005 | Johnson | 704/246 |
| 2008/0113624 | A1 * | 5/2008 | Seidel et al. | 455/67.13 |
| 2008/0221449 | A1 * | 9/2008 | Sato | 600/442 |
| 2010/0273435 | A1 * | 10/2010 | Sun et al. | 455/67.13 |

FOREIGN PATENT DOCUMENTS

| | | |
|---|---|---|
| EP | 0700225 | 3/1996 |
| EP | 0949832 | 10/1999 |
| GB | 2314238 | 12/1997 |
| WO | 01/17136 | 3/2001 |

OTHER PUBLICATIONS

Harris assuredcommunications, Falcon II AN/PRC-150(C), High-Frequency Manpack Radio, Harris Corporation, 2006.

* cited by examiner

*Primary Examiner* — Lana N Le
*Assistant Examiner* — Golam Sorowar
(74) *Attorney, Agent, or Firm* — Allen, Dyer, Doppelt, Milbrath & Gilchrist, P.A. Attoneys at Law

(57) ABSTRACT

An HF radio ALE communication system may include a first HF radio communications device including a first HF radio transceiver and a first controller coupled thereto, and a second HF radio communications device including a second HF radio transceiver and a second controller coupled thereto. The first controller may cooperate with the first HF radio transceiver and may be configured to use ALE to establish a narrowband communication link with the second HF radio communications device, and to communicate a wideband message probe to the second HF radio communications device. The second controller may cooperate with the second HF radio transceiver and may be configured to determine at least one channel characteristic based upon the wideband message probe. The first controller may cooperate with the first HF radio transceiver and may be configured to update the narrowband communication link based upon the at least one channel characteristic.

50 Claims, 3 Drawing Sheets

HIGH FREQUENCY AUTOMATIC LINK ESTABLISHMENT COMMUNICATION SYSTEM WITH WIDEBAND PROBE AND RELATED METHOD

FIELD OF THE INVENTION

The present invention relates to the field of wireless communications, and, more particularly, to high frequency wireless communications and related methods.

BACKGROUND OF THE INVENTION

A typical wireless communication system comprises a plurality of wireless communications devices exchanging data or voice data with each other. One example of a wireless communication system is a high frequency (HF) wireless communication system. The typical HF wireless communication system provides several benefits. For example, the HF wireless communication system offers potential worldwide communication capabilities with little to no infrastructure. Indeed, HF communication is popular with many amateur (HAM) radio operators, permitting one operator to readily contact another operator on another continent. The long range of HF wireless communication systems is to the result of the good propagation characteristics of HF waves through the Earth's atmosphere. Nevertheless, worldwide HF communication may only be available in the best of atmospheric conditions. The atmospheric conditions that may affect HF communications include, for example, sunlight/darkness at site of transmission and reception, season, solar sunspot cycle, solar activity, and polar aurora. Accordingly, the user may manually cycle through several frequencies to find a channel suitable for transmission.

A typical approach to this drawback in HF communication systems is automatic link establishment (ALE) methods. The ALE approach may typically include the transmitter device continuously scanning all available frequencies to determine corresponding quality-of-service (QoS) values for each frequency. Helpfully, the user of the HF communication system need not manually scan and evaluate the available frequencies. When a communication is initiated, the transmitter device selects the best available frequency for the desired transmission path.

Potential drawbacks to the ALE method may include lengthy link establishment times and limited bandwidth. For example, U.S. Pat. No. 5,930,685 to Straub discloses a method of ALE between two devices. This method inserts a 24-bit word in the call transmission for speeding up the link establishment. Moreover, even with ALE, the design of the typical HF wireless communication system may suffer from limited bandwidth, since existing ALE techniques lack capabilities to evaluate channels wider than 3 kHz, and to coordinate bandwidth selection between calling and called stations.

HF communication systems have typically utilized 3000 Hertz (3 kHz) of bandwidth. Several data signaling standards have been developed for these 3 kHz channels. Examples are US Military Standard 188-110B and NATO STANAG 4539. These standards support up to 9600 bits per second (bps) data communications over 3 kHz HF links. In addition, several ALE standards have been developed to support the 3 kHz bandwidth: US MIL-STD 188-141B and NATO STANAG 4538.

As the demand for higher data rates continues to grow, new waveforms/standards are being developed, which expand the utilized bandwidth from 3 kHz up to 24 kHz in 3 kHz increments and the data rate capability from 9600 bps to 76800 bps for HF skywave links and 120000 bps for HF surface wave links. These new HF waveforms are referred to as wideband HF waveforms. Developing and implementing new ALE systems to support these new standards may be very complex and costly to radio manufacturers, especially when multiple bandwidths are available for selection, i.e. 3 kHz, 6 kHz, 9 kHz, etc.

SUMMARY OF THE INVENTION

In view of the foregoing background, it is therefore an object of the present invention to provide a HF radio ALE communication system that is robust in bandwidth capabilities and provides the capability to use multiple bandwidths in an adaptive manner.

This and other objects, features, and advantages in accordance with the present invention are provided by a high frequency (HF) radio automatic link establishment (ALE) communication system that comprises a first HF radio communications device comprising a first HF radio transceiver and a first controller coupled thereto, and a second HF radio communications device comprising a second HF radio transceiver and a second controller coupled thereto. The first controller is operable with the first HF radio transceiver and is configured to use ALE to establish a narrowband communication link, for example, a 3 kHz link, with the second HF radio communications device, and to communicate a wideband message probe to the second HF radio communications device. The second controller is operable with the second HF radio transceiver and is configured to determine at least one channel characteristic based upon the wideband message probe. The first controller is operable with the first HF radio transceiver and is configured to update the narrowband communication link with the second HF radio communications device based upon the at least one channel characteristic. Advantageously, the HF radio ALE communication system may operate without excessive time to connect.

More specifically, the first controller may cooperate with the first HF radio transceiver and may be configured to update the narrowband communication link by sending a narrowband link setup message to the second HF radio communications device. The narrowband link setup message may include data indicating at least one of a desired operable portion of a bandwidth of the wideband message probe and an associated frequency offset value. In other words, the system also permits operation on a wider portion of the frequency spectrum.

Furthermore, the second controller may cooperate with the second HF radio transceiver and may be configured to transmit a narrowband reply message to the first HF radio communications device. Additionally, the wideband message probe may have a bandwidth of 24 kHz.

Another aspect is directed to a method of operating a HF radio ALE communication system including first and second HF radio communications devices. The method includes operating the first HF radio communications device to use ALE to establish a narrowband communication link with the second HF radio communications device, and to communicate a wideband message probe to the second HF radio communications device, operating the second HF radio communications device to determine at least one channel characteristic based upon the wideband message probe, and operating the first HF radio communications device to update the narrowband communication link with the second HF radio communications device based upon the at least one channel characteristic.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout the various figures.

Figure 1:
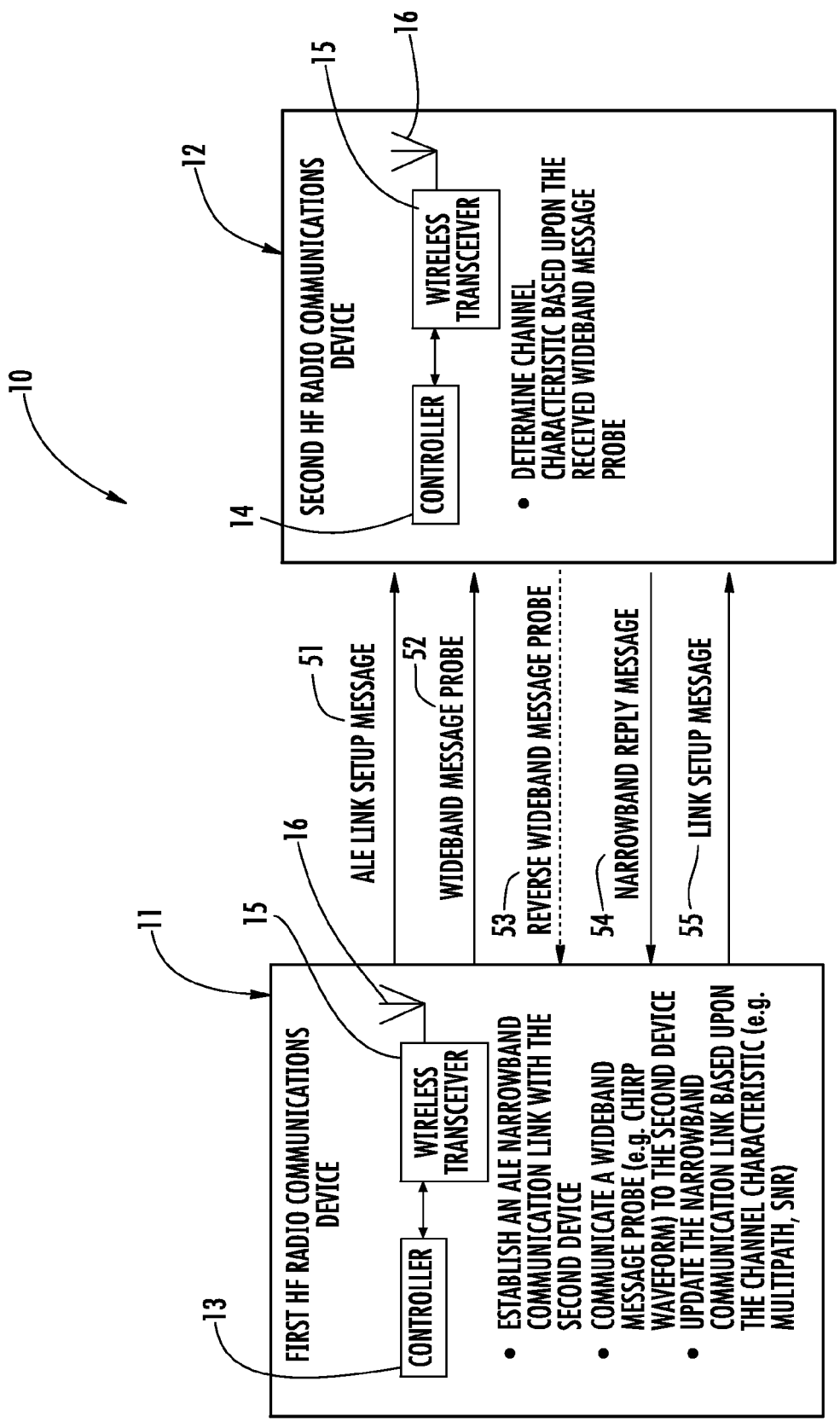
FIG. 1 is a schematic block diagram of an HF radio ALE communication system, according to the present invention.
Figure 2:
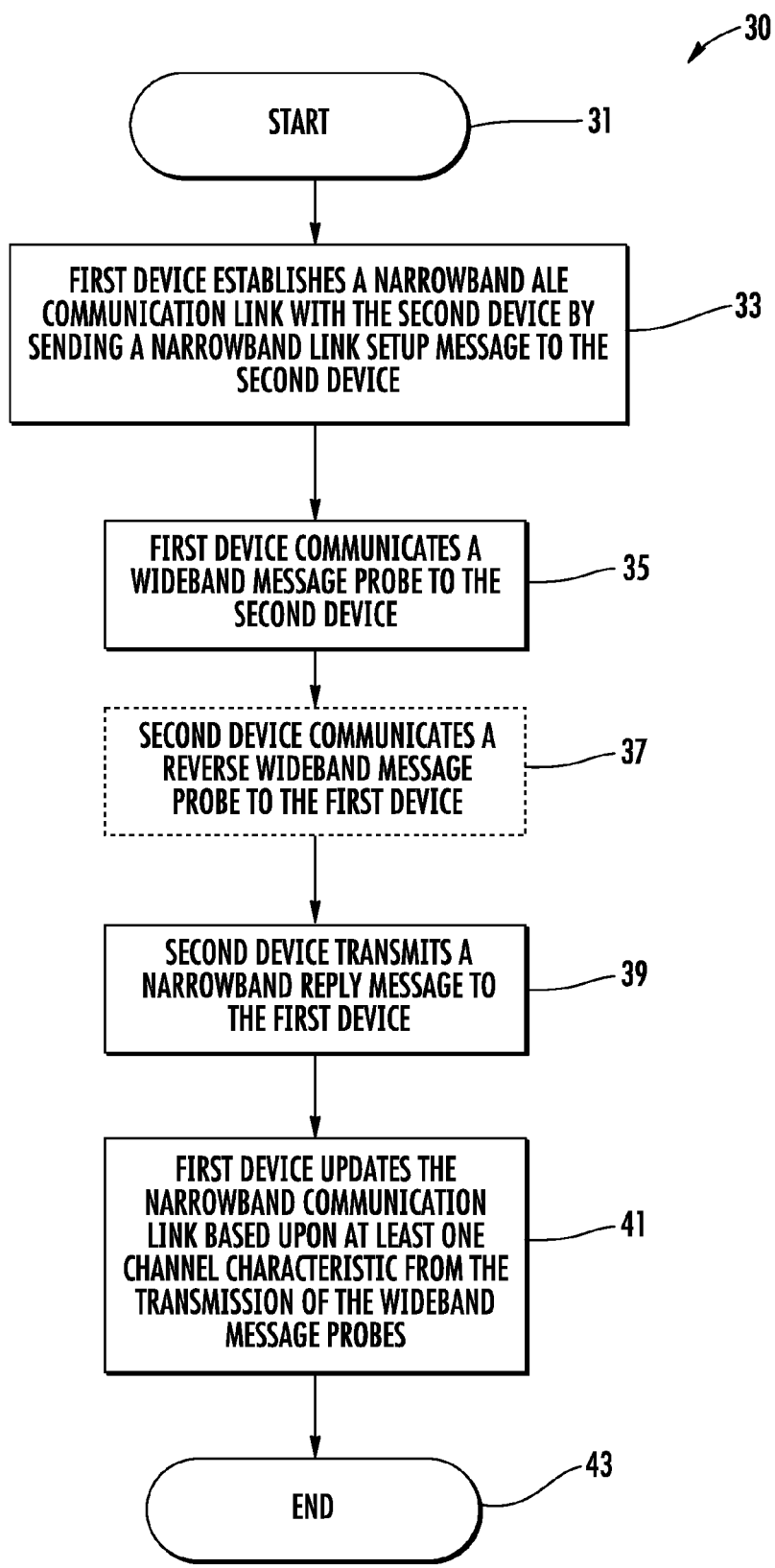
FIG. 2 is a flowchart illustrating operation of the HF radio ALE communication system of FIG. 1.

Referring initially to FIGS. 1-2, a high frequency (HF) radio Automatic Link Establishment (ALE) communication system 10 according to the present invention is now described. The HF radio ALE communication system 10 illustratively includes a first HF radio communications device 11, and a second HF radio communications device 12 communicating therewith. The first HF radio communications device 11 includes a first antenna 16, a first transceiver 15 coupled to the first antenna, and a first controller 13 coupled to the first transceiver. The second HF radio communications device 12 includes a second antenna 16, a second transceiver 15 coupled to the second antenna, and a second controller 14 coupled to the second transceiver.

The first and second HF radio communications devices 11, 12 may operate at 1.5 to 30 MHz. As will be appreciated by those skilled in the art, the HF radio communications devices 11, 12 may include a plurality of differing types of wireless communications devices modified according to the teachings herein, for example, the Falcon® II AN/PRC-150(C) manpack radio, as available from the Harris Corporation of Melbourne, Fla., the assignee of the present application.

The HF radio ALE communication system 10 may use an ALE communication protocol, for example, US MIL-STD-188-141B (2nd Generation ALE) or STANAG 4538 (3rd Generation ALE). Moreover, the HF radio ALE communication system 10 may also include encryption capability as will be appreciated by those skilled in the art.

In FIG. 2, a flowchart 30 illustrates a method of operation of the HF radio ALE communication system 10, which begins at Block 31. The first controller 13 is operable with the first HF radio transceiver 15 to use ALE to establish a narrowband communication link with the second HF radio communications device 12 (Block 33), i.e. an ALE link setup message 51 is sent to the second HF radio communications device 12. As will be appreciated by the skilled person, this setting up of the initial narrowband communication link may use typical existing narrowband ALE handshake protocols. For example, the bandwidth of the narrowband communication link is illustratively 3 kHz, and the ALE protocol may use a listen before talk protocol (LBT), which may listen to a wider than 3 KHz bandwidth.

In particular, a typical standalone ALE radio may comprise an HF single sideband (SSB) radio transceiver with an internal microprocessor and MFSK modem, for example. It may be programmed with a unique ALE Address, similar to a phone number (or on newer generations, a username). When not actively in contact with another station, the HF SSB transceiver may constantly scan through a list of HF frequencies called channels, listening for any ALE signals transmitted by other radio stations. The HF SSB transceiver may decode calls and soundings sent by other stations and may use at least one of a SNR, a channel estimate, an interference value, and a Bit error rate to store a quality score for that frequency and sender-address.

To reach a specific station, the caller enters the ALE Address. The ALE controller selects the best available idle channel for that destination address. After confirming the channel is indeed idle, the ALE controller sends a brief selective calling signal identifying the intended recipient. When the distant scanning station detects ALE activity, it stops scanning and stays on that channel until it can confirm whether or not it is the intended recipient of the call. The two station' ALE controllers then automatically handshake to confirm that a link of sufficient quality has been established, then notify the operators that the link is up. If the call recipient fails to respond or the handshaking fails, the originating ALE node usually selects another frequency either at random or by making an educated guess of varying sophistication.

Once the ALE narrowband communication link is established, the first controller 13 communicates a wideband message probe 52 to the second HF radio communications device 12 (Block 35). For example, the wideband message probe 52 may comprise a chirp waveform probe. Additionally, the wideband message probe may have a bandwidth of 24 kHz, for example.

Once the wideband message probe 52 is received by the second HF radio communications device 12, the second controller 14 is operable with the second HF radio transceiver 15 to determine at least one channel characteristic based upon receipt of the wideband message probe. For example, the channel characteristic may comprise at least one of a multipath value, a signal-to-noise ratio value, a profile noise value, an interference value, an available bandwidth value, a start of the available bandwidth value, and an occupancy value.

In the illustrated embodiment, the second controller 14 is operable with the second HF radio transceiver 15 to transmit a reverse wideband message probe 53 to the first HF radio communications device 11 (Block 37). This transmission of the reverse wideband message probe 53, which is depicted with shadowed lines, is optional.

Furthermore, the second controller 14 cooperates with the second HF radio transceiver 15 to transmit a narrowband reply message 54 to the first HF radio communications device 11 (Block 39). In particular, the narrowband reply message 54 includes, for example, a reverse quality report based upon the receipt of the wideband message probe, i.e. it includes the values for the at least one channel characteristic as determined at the second HF radio communications device 12.

Once the narrowband reply message 54 is received at the first HF radio communications device 11, the first controller 13 cooperates with the first HF radio transceiver 15 to update the narrowband communication link based upon the at least one channel characteristic, which was received in the narrowband reply message (Blocks 41 & 43). In embodiments of the HF radio ALE communication system 10 that use the reverse wideband message probe 53, the first controller 13 may cooperate with the first HF radio transceiver 15 to determine the at least one channel characteristic further based upon the receipt of the reverse wideband message probe.

More specifically, the first controller 13 updates the narrowband communication link by sending a narrowband link setup message 55 to the second HF radio communications device 12. The narrowband link setup message 55 may include data indicating a desired operable portion of a bandwidth of the wideband message probe and an associated frequency offset value. In other words, for example, the narrowband link setup message 55 could indicate that 10 kHz of bandwidth is available with an offset of 7 KHz, i.e. centered at 12.0 kHz. Although the link setup message 55 is illustratively narrowband, in other embodiments, the setup message can be incorporated into a 3 kHz preamble that then expands to a wider bandwidth waveform.

Advantageously, the HF radio ALE communication system 10 may operate on an expanded bandwidth that far exceeds the typical bandwidth of ALE communications. Indeed, the exploration and exchange of transmission characteristics of the wideband expansion is accomplished via the ALE narrowband communication link. Accordingly, the HF radio ALE device modified with the teachings of the present disclosure would not suffer significant lag in setting up the wideband communication. Also, the teachings of the above discussed HF radio ALE communication system 10 can be readily incorporated into existing narrowband, i.e. 3 kHz, communication systems without significant modification. Indeed, the initial connection and handshake may be accomplished through the existing ALE standard.

Figure 3:
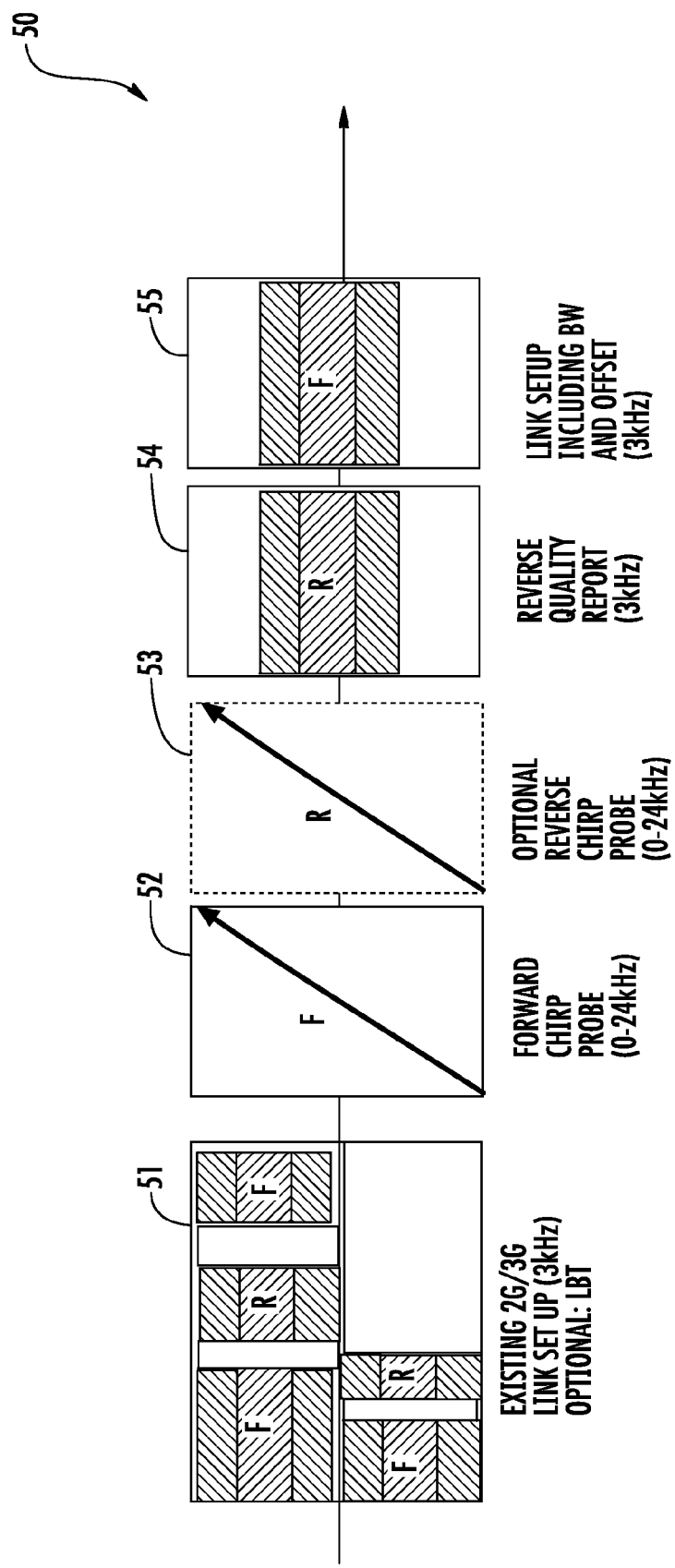
FIG. 3 is a schematic diagram illustrating operation of the HF radio ALE communication system, according to the present invention.

Referring now additionally to FIG. 3, a diagram 50 illustrates communications in another embodiment of the HF radio ALE communication system 10. In this embodiment, the ALE link setup message 51 uses existing 2G/3G ALE standards with wideband LET features. The wideband message probe 52 and the reverse wideband message probe 53 cover a spectrum of 0-24 kHz. Moreover, the narrowband reply message 54 and the link setup message 55 operate with a bandwidth of 3 kHz. As will be appreciated by those skilled in the art, each block 51-55 includes the transmitted waveform samples (what waveform looks like in time domain).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A high frequency (HF) radio automatic link establishment (ALE) communication system comprising:
   a first HF radio communications device comprising a first HF radio transceiver and a first controller coupled thereto; and
   a second HF radio communications device comprising a second HF radio transceiver and a second controller coupled thereto;
   said first controller being operable with said first HF radio transceiver and being configured to use ALE to establish a narrowband communication link with said second HF radio communications device, and to subsequently communicate a wideband message probe to said second HF radio communications device;
   said second controller being operable with said second HF radio transceiver and being configured to determine at least one channel characteristic based upon the wideband message probe, and to transmit a narrowband reply message to said first HF radio communications device, the narrowband reply message including the at least one channel characteristic;
   said first controller being operable with said first HF radio transceiver and being configured to update the narrowband communication link with said second HF radio communications device based upon the at least one channel characteristic.

2. The HF radio ALE communication system according to claim 1 wherein said first controller is operable with said first HF radio transceiver and is configured to update the narrowband communication link by at least sending a narrowband link setup message to said second HF radio communications device, the narrowband link setup message including data indicating at least one of a desired operable portion of a bandwidth of the wideband message probe and an associated frequency offset value.

3. The HF radio ALE communication system according to claim 1 wherein the wideband message probe comprises a chirp waveform message.

4. The HF radio ALE communication system according to claim 1 wherein said second controller is operable with said second HF radio transceiver and is configured to transmit a reverse wideband message probe to said first HF radio communications device; and wherein said first controller is operable with said first HF radio transceiver and is configured to determine the at least one channel characteristic further based upon the reverse wideband message probe.

5. The HF radio ALE communication system according to claim 1 wherein the at least one channel characteristic comprises at least one of a multipath value, a signal-to-noise ratio value, a profile noise value, an interference value, an available bandwidth value, a start of the available bandwidth value, and an occupancy value.

6. The HF radio ALE communication system according to claim 1 wherein the narrowband communication link has a bandwidth of 3 kHz; and wherein the wideband message probe has a bandwidth of 24 kHz.

7. A high frequency (HF) radio automatic link establishment (ALE) communication system comprising:
   a first HF radio communications device comprising a first HF radio transceiver and a first controller coupled thereto; and
   a second HF radio communications device comprising a second HF radio transceiver and a second controller coupled thereto;
   said first controller being operable with said first HF radio transceiver and being configured to use ALE to establish a narrowband communication link with said second HF radio communications device, and to communicate a wideband message chirp probe to said second HF radio communications device;
   said second controller being operable with said second HF radio transceiver and being configured to determine at least one channel characteristic based upon the wideband message chirp probe;
   said first controller being operable with said first HF radio transceiver and being configured to update the narrowband communication link with said second HF radio communications device based upon the at least one channel characteristic by at least sending a narrowband link setup message to said second HF radio communications device, the narrowband link setup message including data indicating at least one of a desired operable portion of a bandwidth of the wideband message chirp probe and an associated frequency offset value.

8. The HF radio ALE communication system according to claim 7 wherein said second controller is operable with said second HF radio transceiver and is configured to transmit a narrowband reply message to said first HF radio communications device, the narrowband reply message including the at least one channel characteristic.

9. The HF radio ALE communication system according to claim 7 wherein said second controller is operable with said second HF radio transceiver and is configured to transmit a reverse wideband message chirp probe to said first HF radio communications device; and wherein said first controller is operable with said first HF radio transceiver and is configured to determine the at least one channel characteristic further based upon the reverse wideband message chirp probe.

10. The HF radio ALE communication system according to claim 7 wherein the at least one channel characteristic comprises at least one of a multipath value, a signal-to-noise ratio value, a profile noise value, an interference value, an available bandwidth value, a start of the available bandwidth value, and an occupancy value.

11. A high frequency (HF) radio automatic link establishment (ALE) communications device comprising:
   a HF radio transceiver; and
   a controller being operable with said HF radio transceiver and being configured to
      use ALE to establish a narrowband communication link with an other HF radio communications device,
      subsequently communicate a wideband message probe to the other HF radio communications device,
      receive a narrowband reply message from the other HF radio communications device, the narrowband reply message including at least one channel characteristic, and
      update the narrowband communication link with the other HF radio communications device based upon receipt of the at least one channel characteristic determined based upon the wideband message probe.

12. The HF radio ALE communications device according to claim 11 wherein said controller is operable with said HF radio transceiver and is configured to update the narrowband communication link by at least sending a narrowband link setup message to the other HF radio communications device, the narrowband link setup message including data indicating at least one of a desired operable portion of a bandwidth of the wideband message probe and an associated frequency offset value.

13. The HF radio ALE communications device according to claim 11 wherein the wideband message probe comprises a chirp waveform message.

14. The HF radio ALE communications device according to claim 11 wherein said controller is operable with said HF radio transceiver and is configured to receive a reverse wideband message probe from the other HF radio communications device and to determine the at least one channel characteristic further based upon the reverse wideband message probe.

15. The HF radio ALE communications device according to claim 11 wherein the at least one channel characteristic comprises at least one of a multipath value, a signal-to-noise ratio value, a profile noise value, an interference value, an available bandwidth value, a start of the available bandwidth value, and an occupancy value.

16. A method of operating a high frequency (HF) radio automatic link establishment (ALE) communication system including first and second HF radio communications devices, the method comprising:
   operating the first HF radio communications device to use ALE to establish a narrowband communication link with the second HF radio communications device, and to subsequently communicate a wideband message probe to the second HF radio communications device;
   operating the second HF radio communications device to determine at least one channel characteristic based upon the wideband message probe;
   operating the second HF radio communications device to transmit a narrowband reply message to the first HF radio communications device, the narrowband reply message including the at least one channel characteristic; and
   operating the first HF radio communications device to update the narrowband communication link with the second HF radio communications device based upon the at least one channel characteristic.

17. The method according to claim 16 wherein updating of the narrowband communication link comprises sending a narrowband link setup message to the second HF radio communications device, the narrowband link setup message including data indicating at least one of a desired operable portion of a bandwidth of the wideband message probe and an associated frequency offset value.

18. The method according to claim 16 wherein communicating the wideband message probe comprises communicating a chirp waveform message.

19. The method according to claim 16 further comprising operating the second HF radio communications device to transmit a reverse wideband message probe to the first HF radio communications device, and operating the first HF radio communications device to determine the at least one channel characteristic further based upon the reverse wideband message probe.

20. The method according to claim 16 wherein determining the at least one channel characteristic comprises determining at least one of a multipath value, a signal-to-noise ratio value, a profile noise value, an interference value, an available bandwidth value, a start of the available bandwidth value, and an occupancy value.

21. The method according to claim 16 further comprising operating the first HF radio communications device to establish the narrowband communication link having a bandwidth of 3 kHz and to transmit the wideband message probe having a bandwidth of 24 kHz.

22. A method of operating a high frequency (HF) radio automatic link establishment (ALE) communications device, the method comprising:
   operating a controller cooperating with a HF radio transceiver to use ALE to establish a narrowband communication link with an other HF radio communications device;
   operating the controller cooperating with the HF radio transceiver to subsequently communicate a wideband message probe to the other HF radio communications device, the other HF radio communications device determining at least one channel characteristic based upon the wideband message probe;
   operating the controller cooperating with the HF radio transceiver to receive a narrowband reply message from the other HF radio communications device, the narrowband reply message including the at least one channel characteristic; and
   operating the controller cooperating with the HF radio transceiver to update the narrowband communication link with the other HF radio communications device based upon the at least one channel characteristic.

23. The method according to claim 22 further comprising operating the controller cooperating with the HF radio transceiver to update the narrowband communication link by at least sending a narrowband link setup message to the other HF radio communications device, the narrowband link setup message including data indicating at least one of a desired operable portion of a bandwidth of the wideband message probe and an associated frequency offset value.

24. The method according to claim 22 wherein the wideband message probe comprises a chirp waveform message.

25. The method according to claim 22 further comprising operating the controller cooperating with the HF radio transceiver to receive a reverse wideband message probe from the other HF radio communications device and to determine the at least one channel characteristic further based upon the reverse wideband message probe.

26. The method according to claim 22 wherein the at least one channel characteristic comprises at least one of a multipath value, a signal-to-noise ratio value, a profile noise value, an interference value, an available bandwidth value, a start of the available bandwidth value, and an occupancy value.

27. A high frequency (HF) radio automatic link establishment (ALE) communication system comprising:
a first HF radio communications device comprising a first HF radio transceiver and a first controller coupled thereto; and
a second HF radio communications device comprising a second HF radio transceiver and a second controller coupled thereto;
said first controller being operable with said first HF radio transceiver and being configured to use ALE to establish a narrowband communication link with said second HF radio communications device, and to communicate a wideband message probe to said second HF radio communications device;
said second controller being operable with said second HF radio transceiver and being configured to determine at least one channel characteristic based upon the wideband message probe;
said first controller being operable with said first HF radio transceiver and being configured to update the narrowband communication link with said second EF radio communications device based upon the at least one channel characteristic and by at least sending a narrowband link setup message to said second HF radio communications device, the narrowband link setup message including data indicating at least one of a desired operable portion of a bandwidth of the wideband message probe and an associated frequency offset value.

28. The HF radio ALE communication system according to claim 27 wherein the narrowband communication link has a bandwidth of 3 kHz; and wherein the wideband message probe has a bandwidth of 24 kHz.

29. The HF radio ALE communication system according to claim 27 wherein the at least one channel characteristic comprises at least one of a multipath value, a signal-to-noise ratio value, a profile noise value, an interference value, an available bandwidth value, a start of the available bandwidth value, and an occupancy value.

30. A high frequency (HF) radio automatic link establishment (ALE) communication system comprising:
a first HF radio communications device comprising a first HF radio transceiver and a first controller coupled thereto; and
a second HF radio communications device comprising a second HF radio transceiver and a second controller coupled thereto;
said first controller being operable with said first HF radio transceiver and being configured to use ALE to establish a narrowband communication link with said second HF radio communications device, and to communicate a wideband message probe to said second HF radio communications device;
said second controller being operable with said second HF radio transceiver and being configured to determine at least one channel characteristic based upon the wideband message probe, and to transmit a reverse wideband message probe to said first HF radio communications device;
said first controller being operable with said first HF radio transceiver and being configured to update the narrowband communication link with said second HF radio communications device based upon the at least one channel characteristic, and to determine the at least one channel characteristic further based upon the reverse wideband message probe.

31. The HF radio ALE communication system according to claim 30 wherein the wideband message probe comprises a chirp waveform message.

32. The HF radio ALE communication system according to claim 30 wherein the at least one channel characteristic comprises at least one of a multipath value, a signal-to-noise ratio value, a profile noise value, an interference value, an available bandwidth value, a start of the available bandwidth value, and an occupancy value.

33. A high frequency (HF) radio automatic link establishment (ALE) communications device comprising:
a HF radio transceiver; and
a controller being operable with said HF radio transceiver and being configured to
use ALE to establish a narrowband communication link with an other HF radio communications device,
communicate a wideband message probe to the other HF radio communications device, and
update the narrowband communication link with the other HF radio communications device based upon receipt of at least one channel characteristic determined based upon the wideband message probe, the updating comprising sending a narrowband link setup message to the other HF radio communications device, the narrowband link setup message including data indicating at least one of a desired operable portion of a bandwidth of the wideband message probe and an associated frequency offset value.

34. The HF radio ALE communications device according to claim 33 wherein the wideband message probe comprises a chirp waveform message.

35. The HF radio ALE communications device according to claim 33 wherein the at least one channel characteristic comprises at least one of a multipath value, a signal-to-noise ratio value, a profile noise value, an interference value, an available bandwidth value, a start of the available bandwidth value, and an occupancy value.

36. A high frequency (HF) radio automatic link establishment (ALE) communications device comprising:
a HF radio transceiver; and
a controller being operable with said HF radio transceiver and being configured to
use ALE to establish a narrowband communication link with an other HF radio communications device,
communicate a wideband message probe to the other HF radio communications device,
receive a reverse wideband message probe from the other HF radio communications device,
determine at least one channel characteristic based upon the reverse wideband message probe and the wideband message probe, and
update the narrowband communication link with the other HF radio communications device based upon the at least one channel characteristic.

37. The HF radio ALE communications device according to claim 36 wherein the wideband message probe comprises a chirp waveform message.

38. The HF radio ALE communications device according to claim 36 wherein the at least one channel characteristic comprises at least one of a multipath value, a signal-to-noise ratio value, a profile noise value, an interference value, an available bandwidth value, a start of the available bandwidth value, and an occupancy value.

39. A method of operating a high frequency (HF) radio automatic link establishment (ALE) communication system including first and second HF radio communications devices, the method comprising:
   operating the first HF radio communications device to use ALE to establish a narrowband communication link with the second HF radio communications device, and to communicate a wideband message probe to the second HF radio communications device;
   operating the second HF radio communications device to determine at least one channel characteristic based upon the wideband message probe; and
   operating the first HF radio communications device to update the narrowband communication link with the second HF radio communications device based upon the at least one channel characteristic, the updating of the narrowband communication link comprising sending a narrowband link setup message to the second HF radio communications device, the narrowband link setup message including data indicating at least one of a desired operable portion of a bandwidth of the wideband message probe and an associated frequency offset value.

40. The method according to claim 39 wherein the wideband message probe comprises a chirp waveform message.

41. The method according to claim 39 wherein the at least one channel characteristic comprises at least one of a multipath value, a signal-to-noise ratio value, a profile noise value, an interference value, an available bandwidth value, a start of the available bandwidth value, and an occupancy value.

42. A method of operating a high frequency (HF) radio automatic link establishment (ALE) communication system including first and second HF radio communications devices, the method comprising:
   operating the first HF radio communications device to use ALE to establish a narrowband communication link with the second HF radio communications device, and to communicate a wideband message probe to the second HF radio communications device;
   operating the second HF radio communications device to determine at least one channel characteristic based upon the wideband message probe and to transmit a reverse wideband message probe to the first HF radio communications device; and
   operating the first HF radio communications device to determine the at least one channel characteristic further based upon the reverse wideband message probe and to update the narrowband communication link with the second HF radio communications device based upon the at least one channel characteristic.

43. The method according to claim 42 wherein the wideband message probe comprises a chirp waveform message.

44. The method according to claim 42 wherein the at least one channel characteristic comprises at least one of a multipath value, a signal-to-noise ratio value, a profile noise value, an interference value, an available bandwidth value, a start of the available bandwidth value, and an occupancy value.

45. A method of operating a high frequency (HF) radio automatic link establishment (ALE) communications device, the method comprising:
   operating a controller cooperating with a HF radio transceiver to use ALE to establish a narrowband communication link with an other HF radio communications device;
   operating the controller cooperating with the HF radio transceiver to communicate a wideband message probe to the other HF radio communications device, the other HF radio communications device determining at least one channel characteristic based upon the wideband message probe; and
   operating the controller cooperating with the HF radio transceiver to update the narrowband communication link with the other HF radio communications device based upon the at least one channel characteristic by at least sending a narrowband link setup message to the other HF radio communications device, the narrowband link setup message including data indicating at least one of a desired operable portion of a bandwidth of the wideband message probe and an associated frequency offset value.

46. The method according to claim 45 wherein the wideband message probe comprises a chirp waveform message.

47. The method according to claim 45 wherein the at least one channel characteristic comprises at least one of a multipath value, a signal-to-noise ratio value, a profile noise value, an interference value, an available bandwidth value, a start of the available bandwidth value, and an occupancy value.

48. A method of operating a high frequency (HF) radio automatic link establishment (ALE) communications device, the method comprising:
   operating a controller cooperating with a HF radio transceiver to use ALE to establish a narrowband communication link with an other HF radio communications device;
   operating the controller cooperating with the HF radio transceiver to communicate a wideband message probe to the other HF radio communications device, the other HF radio communications device determining at least one channel characteristic based upon the wideband message probe; and
   operating the controller cooperating with the HF radio transceiver to update the narrowband communication link with the other HF radio communications device based upon the at least one channel characteristic, and to receive a reverse wideband message probe from the other HF radio communications device and to determine the at least one channel characteristic further based upon the reverse wideband message probe.

49. The method according to claim 48 wherein the wideband message probe comprises a chirp waveform message.

50. The method according to claim 48 wherein the at least one channel characteristic comprises at least one of a multipath value, a signal-to-noise ratio value, a profile noise value, an interference value, an available bandwidth value, a start of the available bandwidth value, and an occupancy value.

\* \* \* \* \*